(12) United States Patent
Cleveland et al.

(10) Patent No.: US 9,986,138 B2
(45) Date of Patent: *May 29, 2018

(54) EYETRACKER MOUNTS FOR USE WITH HANDHELD DEVICES

(71) Applicant: LC Technologies, Inc., Fairfax, VA (US)

(72) Inventors: Dixon Cleveland, Annandale, VA (US); Jonathan Alexandar West, Great Falls, VA (US)

(73) Assignee: LC Technologies, Inc., Fairfax, VA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/493,986

(22) Filed: Apr. 21, 2017

(65) Prior Publication Data

US 2017/0230549 A1 Aug. 10, 2017

Related U.S. Application Data

(63) Continuation of application No. 14/726,327, filed on May 29, 2015, now Pat. No. 9,704,036.

(60) Provisional application No. 62/005,859, filed on May 30, 2014.

(51) Int. Cl.
*H04N 5/225* (2006.01)
*G06K 9/00* (2006.01)
*H04N 5/232* (2006.01)

(52) U.S. Cl.
CPC ....... *H04N 5/2253* (2013.01); *G06K 9/00355* (2013.01); *G06K 9/00604* (2013.01); *H04N 5/23296* (2013.01)

(58) Field of Classification Search
CPC ............. H04N 5/2253; H04N 5/23296; G06K 9/00355; G06K 9/00604
USPC .......................................................... 382/103
See application file for complete search history.

(56) References Cited

U.S. PATENT DOCUMENTS

| | | | |
|---|---|---|---|
| 6,154,317 A * | 11/2000 | Segerstrom ............ | F16M 11/08 250/203.1 |
| 2010/0198009 A1* | 8/2010 | Farr .................... | A61B 1/00103 600/109 |
| 2010/0322479 A1* | 12/2010 | Cleveland ............... | G06F 3/012 382/103 |

* cited by examiner

*Primary Examiner* — Amandeep Saini
(74) *Attorney, Agent, or Firm* — John R. Kasha; Kelly L. Kasha; Kasha Law LLC

(57) ABSTRACT

A device for performing eyetracking on a handheld device includes and eyetracking camera and an eyetracking camera boom mount. The eyetracking camera boom mount physically and electrically connects a handheld device and the eyetracking camera. The eyetracking camera boom mount includes an extension boom that positions the eyetracking camera behind the user's hands. The extension boom provides the eyetracking camera with a view of the user's eyes that is unobstructed by the user's hands. The device can further include an operating scene camera for monitoring a person's hand operations on the handheld device. The operating scene camera can be mounted on the same extension boom as the eyetracking camera or on a separate extension boom.

12 Claims, 7 Drawing Sheets

EYETRACKER MOUNTS FOR USE WITH HANDHELD DEVICES

CROSS-REFERENCE TO RELATED APPLICATION

This application is a continuation of U.S. patent application Ser. No. 14/726,327, filed May 29, 2015, which claims the benefit of U.S. Provisional Patent Application No. 62/005,859, filed May 30, 2014, the content of all of the above is incorporated by reference herein in their entireties.

INTRODUCTION

When a person is operating a handheld device, such as a smart phone or tablet computer, it is sometimes desired to track the person's gazepoint on and/or around the device. A key design problem in this gaze tracking application is the positioning of the eyetracking camera. In particular, it is important to allow the user full, normal operation of his hands, fingers and thumbs, while not obstructing the eyetracking instrument's view of the eyes, or obstructing the user's view of the device and its display. As a result, mounting methods for attaching eyetracking instruments to handheld devices are needed to overcome these conflicts between continuous eyetracking and full, natural hand motions.

Before one or more embodiments of the invention are described in detail, one skilled in the art will appreciate that the invention is not limited in its application to the details of construction, the arrangements of components, and the arrangement of steps set forth in the following detailed description or illustrations. The invention is capable of other embodiments and of being practiced or being carried out in various ways. Also, it is to be understood that the phraseology and terminology used herein is for the purpose of description and should not be regarded as limiting.

DETAILED DESCRIPTION

Computer-Implemented System

Figure 5:
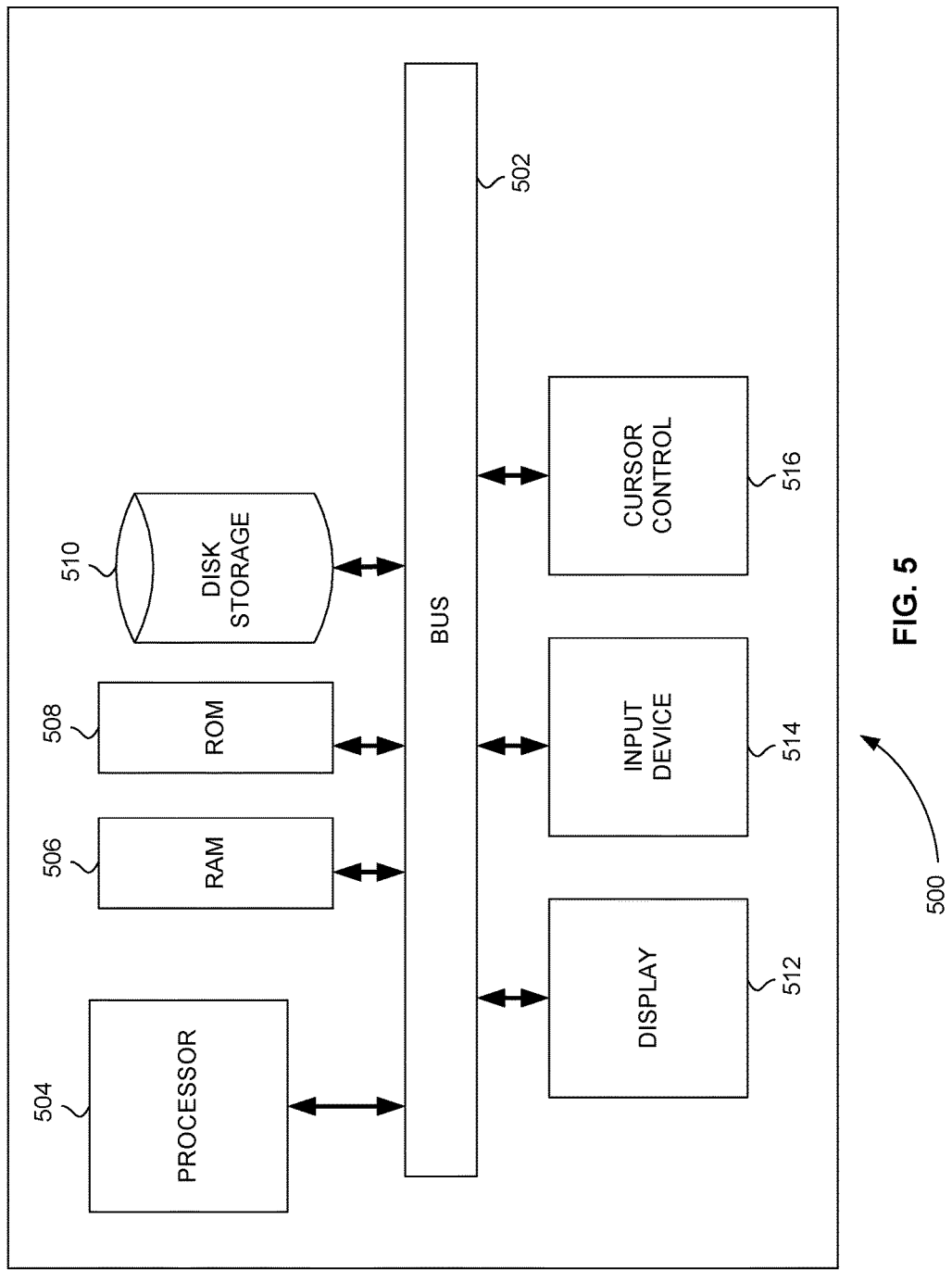
FIG. 5 is a block diagram that illustrates a computer system, in accordance with various embodiments.

FIG. 5 is a block diagram that illustrates a computer system 500, upon which embodiments of the present teachings may be implemented. Computer system 500 includes a bus 502 or other communication mechanism for communicating information, and a processor 504 coupled with bus 502 for processing information. Computer system 500 also includes a memory 506, which can be a random access memory (RAM) or other dynamic storage device, coupled to bus 502 for storing instructions to be executed by processor 504. Memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball or cursor direction keys for communicating direction information and command selections to processor 504 and for controlling cursor movement on display 512. This input device typically has two degrees of freedom in two axes, a first axis (i.e., x) and a second axis (i.e., y), that allows the device to specify positions in a plane. Yet another type of user input device is a touch screen, allowing the user to touch the screen to select or activate items or functions displayed on the screen. An additional type of input device may be an eyetracker, including an eyetracking camera that looks at the user's eye(s) and means for calculating where on the screen the user is looking, allowing the user to select or activate items or functions displayed on the screen by looking at them.

A computer system 500 can perform the present teachings. Consistent with certain implementations of the present teachings, results are provided by computer system 500 in response to processor 504 executing one or more sequences of one or more instructions contained in memory 506. Such instructions may be read into memory 506 from another computer-readable medium, such as storage device 510. Execution of the sequences of instructions contained in memory 506 causes processor 504 to perform the process described herein. Alternatively hard-wired circuitry may be used in place of or in combination with software instructions to implement the present teachings. Thus implementations of the present teachings are not limited to any specific combination of hardware circuitry and software.

In various embodiments, computer system 500 can be connected to one or more other computer systems, like computer system 500, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The other computer systems that send and receive data to and from the servers or the cloud can be referred to as client or cloud devices, for example.

The term "computer-readable medium" as used herein refers to any media that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as memory 506. Transmission media includes coaxial cables, copper wire, and fiber optics, including the wires that comprise bus 502.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector coupled to bus 502 can receive the data carried in the infra-red signal and place the data on bus 502. Bus 502 carries the data to memory 506, from which processor 504 retrieves and executes the instructions. The instructions received by memory 506 may optionally be stored on storage device 510 either before or after execution by processor 504.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Eyetracker and Eyefollower

In general, an eyetracker or an eyegaze system is a device or instrument that is used to determine where an eye is looking. Modern eyetrackers, sometimes referred to as video eyetrackers, are camera-based devices that observe a person's eyes and predict the point in space where the person is looking. This point in space is referred to as the gazepoint, for example. The line connecting the fovea of the eye, the center of the eye pupil, and the gazepoint is referred to as the gaze line, for example.

Figure 6:
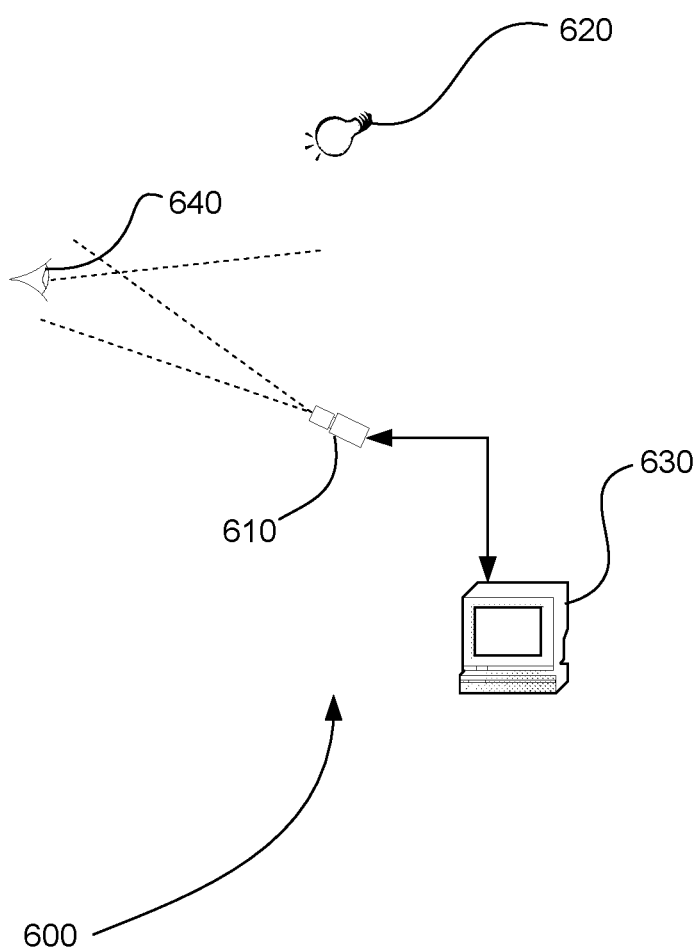
FIG. 6 is a schematic diagram showing an eyetracker, in accordance with various embodiments.

FIG. 6 is a schematic diagram showing an eyetracker 600, in accordance with various embodiments. Eyetracker 600 includes camera 610, illumination source 620, and processor 630. Illumination source 620 illuminates eye 640, and camera 610 images eye 640. Processor 630 receives the image from camera 610 and determines the position and focus condition of eye 640 within the camera image. Based on the position and focus condition of the eye within the camera image, the processor is able to compute the 3D location and orientation of actual eye 640 within the camera body frame of reference.

Eyetracker 600 can include additional elements. For example, eyetracker 600 can include one or more additional cameras (not shown) or one or more additional optical devices (not shown) to determine the range from camera 610 to eye 640. Eyetracker 600 can also include a display (not shown) to determine the gazepoint in an image displayed by processor 630 on the display.

An important objective of many eyetrackers is to allow the user to move his head freely while the eyetracker continues to track the user's gaze with high accuracy. Typical head motions involve moving (translating) the head from side to side, up and down, and back and forth; and involve rotating the head forward and back (pitching or nodding), rotating the face from left to right (yawing or shaking), and rotating the head toward one shoulder or the other (rolling). One method for minimizing head motion with respect to an eyetracking device is to place the eyetracker device on the user's head, attached to a pair of glasses, for example. In many applications, however, it is desired to position the eye eyetracking device at a remote, off-head location. Accommodating head motion with respect to the eyetracker platform is particularly relevant to the objective of capturing high quality, high resolution eye images in remote eyetrackers.

To accommodate variable positions and orientations of the head with respect to the eyetracker platform, eyetrackers may include mechanized devices to keep the eyetracking camera(s) physically pointed at and/or focused on the user's eye(s). A motorized pan-tilt device, such as a gimbal, may be used, for example, to keep the camera's view direction pointed at the eye or eyes; and a focus motor may be used to keep the eye(s) in focus. Eyetrackers that utilize such mechanical means to automatically point or focus their eyetracking cameras on the eyes are sometimes referred to as eyefollowers.

Figure 7:
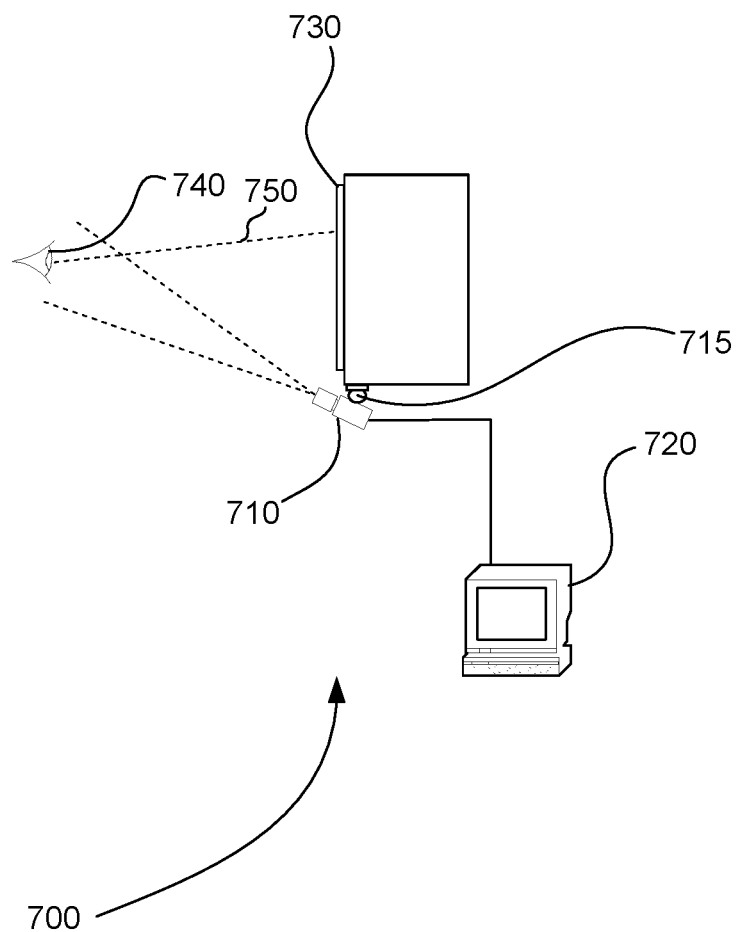
FIG. 7 is a schematic diagram showing an eyetracker that includes an eyefollower, in accordance with various embodiments.

FIG. 7 is a schematic diagram showing an eyetracker 700 that includes an eyefollower, in accordance with various embodiments. Eyetracker 700 includes camera 710, camera-pointing gimbal 715, and processor 720. The eyefollower portion of eyetracker 700 includes, for example, a motorized mechanical configuration comprising gimbal 715 to keep the camera pointed at the user's eyes and a motorized lens (not shown) for camera 710 that implements a variable-focus range. The eyefollower portion of eyetracker 700 may also include a motorized zoom capability (not shown) for camera 710 that implements a variable zoom. Gimbal 715 controls the yaw (pan) and pitch (tilt) of camera 710, which, in turn, are used to follow a user's eye 740 as the user moves his head and/or eye 740 from side to side and up and down, respectively. The motorized lens for camera 710 is used to follow the user's eye 740 as the user moves his head forward or backward, and it may also be used in the computation of the range from the camera to the eye based on a measurement of the lens length required to put the eye in focus. The motorized zoom for camera 710 may be used to control the desired size, i.e., pixel resolution, of the eye image within the camera image as the user moves his head forward and backward. The camera-pointing gimbal 715 can be optionally secured to display 730, mechanically linking the coordinate system of camera 710 to display 730, for example. Note that camera 710 can also include an illumination source (not shown).

Processor 720, for example, executes control loop algorithms required to keep the camera pointed at, focused on, and zoomed on eye 740 as the user moves his head. Processor 720 also executes, for example, algorithms used to solve rigorous trigonometric gazepoint tracking equations, referred to as "explicit raytrace algorithms." These explicit raytrace algorithms are used to accurately predict the user's gazepoint 750 on display 730, fully accommodating the variable camera geometry and the moving head and/or eye 740.

Eyetracker Camera Mounts for Use with Handheld Devices

As noted above, when a person is operating a handheld device it is sometimes desired to track the person's gazepoint on and/or around the device. A key design problem in this gaze tracking application is the positioning of the eyetracking camera. In particular, it is important to allow the user full, normal operation of his hand(s), finger(s) and thumb(s), while not obstructing the eyetracking instrument's view of the eyes, or obstructing the user's view of the device.

In various embodiments, methods for attaching eyetracker instruments, such as an eyetracking camera and/or an operating-scene camera, to handheld devices are provided to overcome these conflicts between continuous eyetracking and full, natural hand motions.

Figure 1:
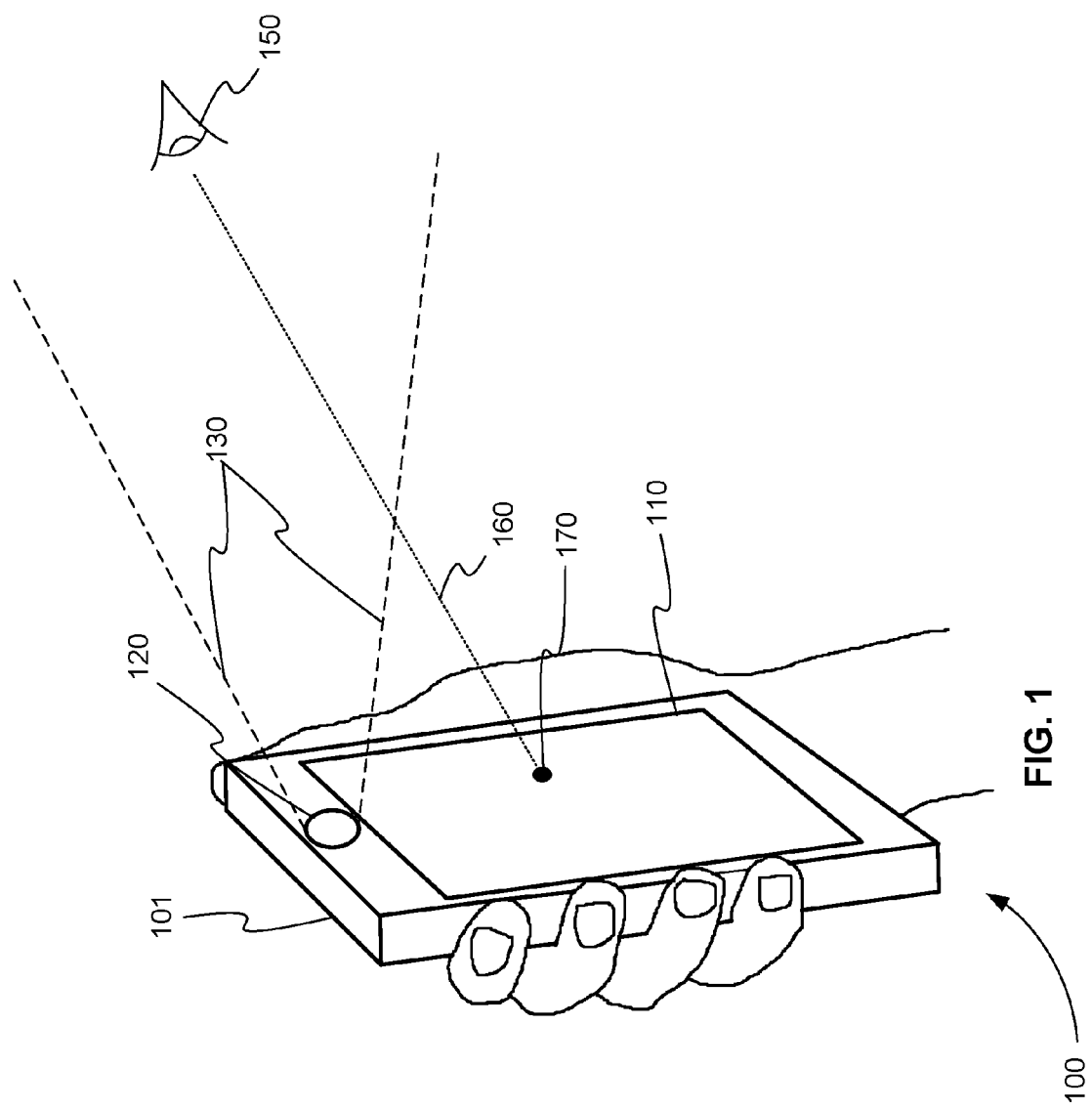
FIG. 1 shows a typical hand held computer device with a display screen, a user's eye looking at the display screen and a camera mounted above the display screen that may be configured to observe the user's eye.

FIG. 1 is a schematic diagram 100 of a handheld device that includes eyetracking, in accordance with various embodiments. As illustrated in FIG. 1, the eyetracking camera 120 could be mounted at the top of the handheld device 101, above the device's display screen 110. This configuration would allow the eyetracker camera 120 what might seem to be an unobstructed view 130 of the user's eye(s) 150 while allowing the user free motion of his hands to operate the device naturally—without the hand(s) obstructing the eyetracker camera's view of the user's eyes. A significant advantage of the eyetracker camera 120 being located above the display screen 110 as shown in the FIG. 1 is that the camera 120 may be embedded within the main body of the handheld device 101, minimizing the overall size and dimensions of the handheld device 101. (In FIG. 1, the eye's gaze line is indicated by dashed line 160, and the user's gazepoint on the display is indicated by the dot 170.)

A key shortcoming of mounting the eyetracking camera 120 above the display 110, however, is that when a person is looking below an eyetracking camera, his upper eyelids can often block a sufficiently complete view of the eyeball required for the eyetracking camera to accurately measure the eye orientation. Thus, for reliable eyetracker operation, it is not sufficient to simply provide the camera with a good view of the eye region of the user's face; it is also necessary to provide a sufficient view of the eyeball itself, unobstructed by the eyelids. (In pupil-center/corneal reflection (PCCR) method eyetrackers, for example, it is necessary for the eyetracker to see both the pupil and the corneal reflection in order to compute the eye's angular orientation, and thus to compute the eye's gazepoint.) To allow a more complete view of the eyeball, with less obstruction from the eyelids, it is common, as illustrated in FIG. 7, to place the eyetracking camera below the screen the user is viewing.

When the screen is a small handheld device, however, rather than a larger computer screen, embedding the eyetracker camera both a) within the main body of the device and b) below the display area, results in a significant operational problem: the user's hands, in the normal operation of the handheld device, can easily obstruct the camera's view of the eyes.

Figure 2:
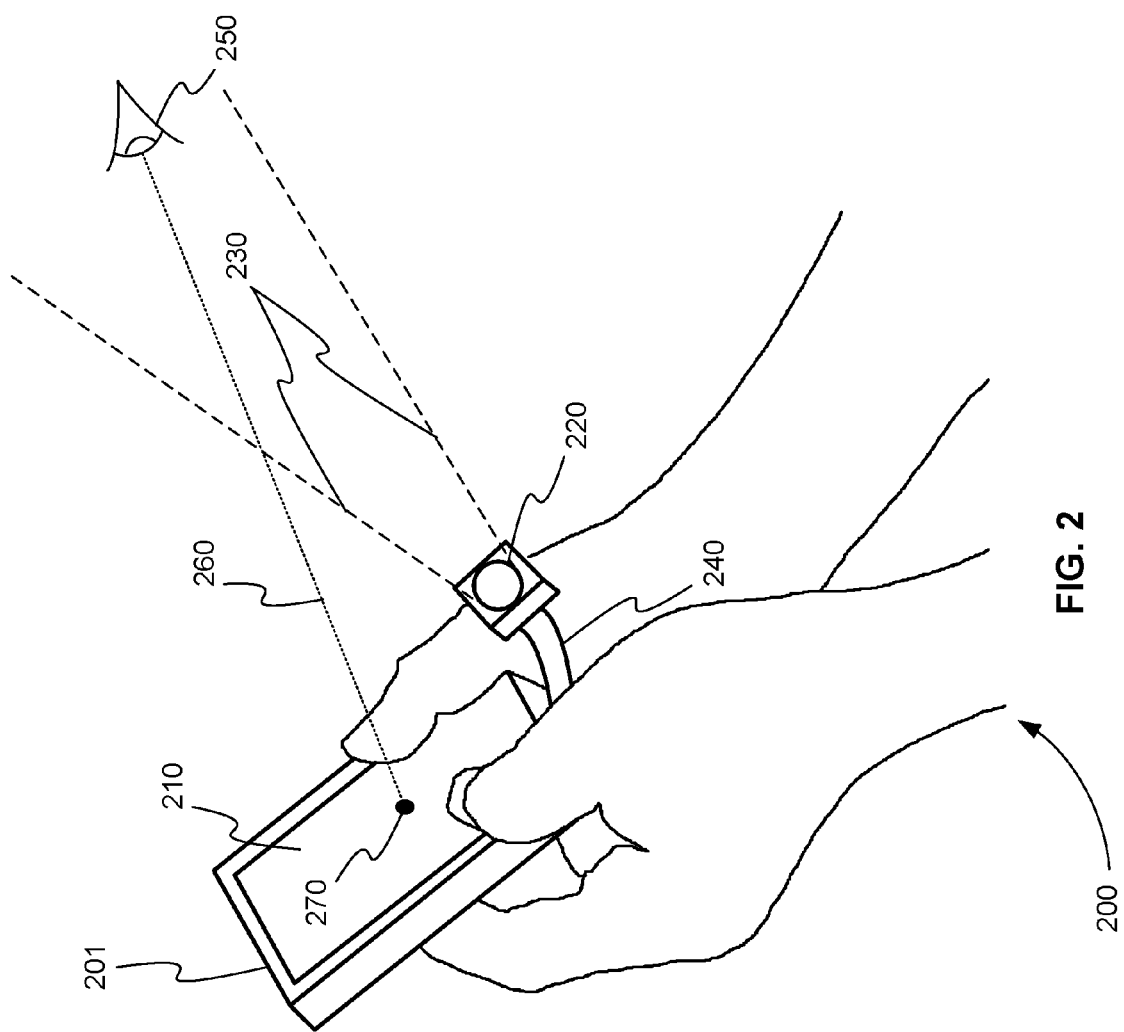
FIG. 2 shows a hand held computer device where the eyetracking camera is mounted below the display screen and mounted on an extension boom that positions the camera behind the user's hands and provides the camera with an unobstructed view of the user's eye or eyes, in accordance with various embodiments.

FIG. 2 is a schematic diagram 200 showing an eyetracker extension boom mount 240 for use with a handheld device 201, in accordance with various embodiments. Eyetracking camera 220 is located below the screen of handheld device 201. Eyetracker extension boom mount 240 is attached at one end to the bottom end of handheld device 201, below display 210, and attaches at the other end to eyetracking camera 220. Eyetracker boom mount 240 positions eyetracking camera 220 behind the user's hands, providing the eyetracker camera with a view of the user's eyes that is unobstructed by the user's hand(s). Eyetracking camera 220 points towards the user's eyes 250. In addition to keeping the user's hands from obscuring the eyetracking camera's view 230 of the user's eyes 250, this embodiment minimizes the camera's physical interference of the user's hand operations and allows the user an unobstructed view of the device 201 and its display 210. In FIG. 2, the eye's gaze line is indicated by dashed line 260, and the user's gazepoint on the display 210 is indicated by the dot 270. In addition to mechanically (or physically) connecting the eyetracking camera 220 to the handheld device 201, extension boom mount 240 may provide electrical and electronic connections between eyetracking camera 220 and handheld device 201. In some cases, information transferred between eyetracking camera 220 and handheld device 201 may be transmitted wirelessly.

In various embodiments, an eyetracker boom mount for use with a handheld device 1) provides the eyetracking camera an unobstructed view of the user's eyes, allowing continuous eyetracking, 2) allows the user to move his handheld device around freely, 3) allows the user to physically access the handheld device freely with either or both hands, 4) provides minimum interference of the user's natural hand operations of the handheld device, and 5) maintains the user's full vision of the handheld device and its displays.

Flexible Booms

Figure 3:
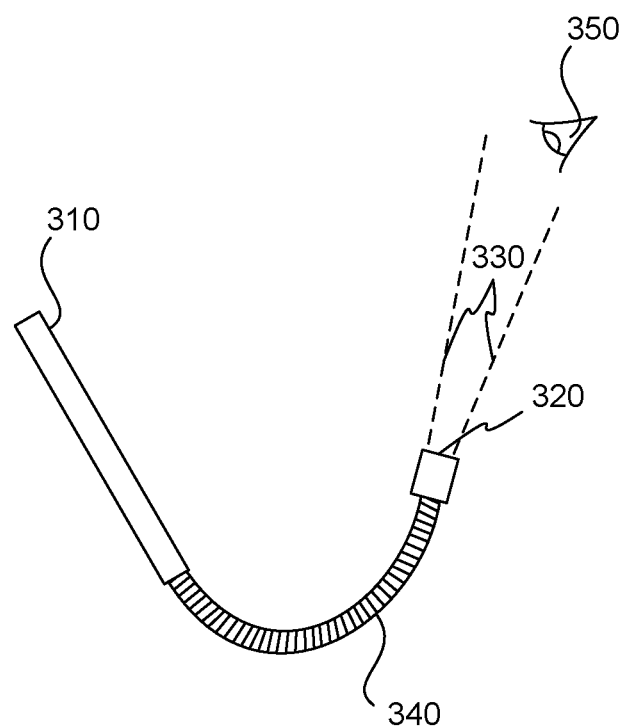
FIG. 3 illustrates a handheld computer device where the eyetracking camera is mounted on a flexible extension boom, allowing the orientation of the eyetracking camera to be adjusted to point at the user's eye, in accordance with various embodiments.

FIG. 3 is a side view 300 of an eyetracker boom mount, in accordance with various embodiments. As illustrated in FIG. 3, extension boom mount 340 can be made of any material that is flexible, allowing the pointing orientation or observed view 330 of the eyetracking camera 320 to be adjusted to point at the user's eye 350. Alternatively, the extension boom mount 340 can be a semi-rigid arm made of, for example, semi-rigid materials. One skilled in the art will appreciate that other types of materials can be used for the extension boom connecting the eyetracking camera/operating-scene camera 320 and the handheld device 310.

In various embodiments, a flexible extension boom may contain sensors or instrumentation to measure the position and/or orientation of the eyetracking camera with respect to the handheld device and/or its display. Thus, for example, as a flexible boom is moved and the position and/or orientation of the eyetracking camera moves with respect to the handheld device and/or its display, the user's gazepoint on the handheld device and/or display may be calculated accurately from the eyetracker's image of the user's eye(s) based on the known position and orientation of the eyetracking camera (s), despite the movement of the eyetracking camera(s) with respect to the handheld device. For example, coordinate transformation methods, well known in the field of eyetracking optical ray tracing, may be used to accommodate changes in eyetracking camera position and orientation with respect to the handheld device. ("Explicit Raytracing for Gimbal-Based Gazepoint Trackers," U.S. Pat. No. 7,686,451.)

Operating-Scene Camera Mounts for Use with Handheld Devices

When a person is operating a handheld device, it is sometimes desired to monitor his hand activity with respect to the display and/or touch screen. Observing hand activity may be useful, for example, in determining the usability of the device itself, evaluating the usability of an application running on the device, or monitoring the user response to situations presented by an application program being run on the handheld device. In this specification, a camera that monitors a) the user's hand operations (including hand, finger and thumb movements), b) the device display, and/or c) the area around the device's display, is termed an "operating-scene camera," or simply a "scene camera." In various embodiments, operating-scene cameras can be implemented on handheld devices either independently of or in conjunction with eyetracking cameras.

Figure 4:
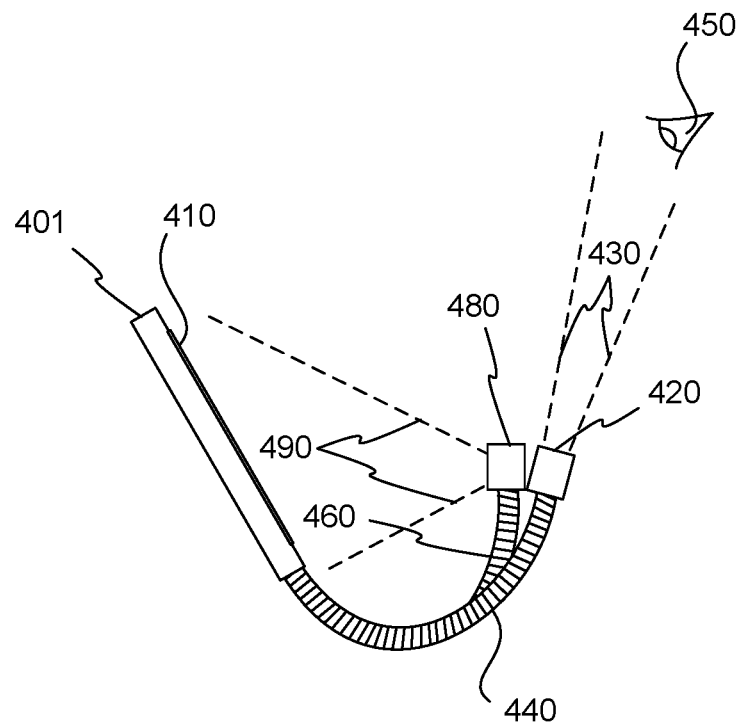
FIG. 4 illustrates a handheld computer device where an additional operating-scene camera, positioned adjacent to the eyetracking camera behind the use's hands, monitors both the device screen area and the user's fingers and hands, providing feedback about the user hand/finger operations as the user operates the handheld device, in accordance with various embodiments.

FIG. 4 is a side view 400 of a handheld device 401 equipped with both an operating-scene camera 480 and an eyetracker camera 420. Boom mounts 440 and 460 position both eyetracking camera 420 and operating-scene camera 480 behind the user's hand(s) (not shown). In contrast to the eyetracking camera 480 facing in the direction of the user's eye(s) 450, the operating-scene camera faces toward the handheld device and toward the user's hand(s). The field of view of operating-scene camera 480 is indicated by the dashed lines 490. Similar to eyetracker boom mount 440 in FIG. 4, operating-scene camera boom 460 is attached to the bottom of handheld device 401 below the display screen 410.

When it is desired to include an operating-scene camera for use with a handheld device, operating-scene camera 480 may be attached to handheld device 401 in several configurations. In one embodiment (not shown), scene camera 480 may be mechanically attached directly to eyetracking camera 420, with the electrical connections to/from handheld device 401 travelling through eyetracking camera 420 and eyetracker-camera boom 440. This configuration has the constraint, however, that the relative viewing directions of the scene and eyetracking cameras cannot be adjusted with respect to one another. In various embodiments, scene camera 480 may be mounted on its own extension boom 460, providing separate direction adjustments for the scene and eyetracking cameras. Extension boom 460 may originate directly (not shown) from handheld device 401 or emerge from eyetracker-camera boom mount 440, as shown in FIG. 4. Thus, in various embodiments, a single extension boom for both eyetracking camera 420 and operating-scene camera 480 is attached to the handheld device 401, the boom then splitting, or dividing, into two booms, or branches, one attached to eyetracking camera 420 and the other attached to operating scene camera 480.

In various embodiments, operating-scene camera extension boom 460 may be flexible.

In various embodiments, operating-scene camera extension boom 460 may be detachable from handheld device 401.

In various embodiments, operating-scene camera 480 may be connected to operating-scene camera mount 460 through a motorized camera-pointing gimbal that allows operating-scene camera 480 to follow the movement of the user's hands.

Eyetracker Interfaces to Handheld Devices

In various embodiments, the handheld device 401 is a smartphone or tablet computer, for example. Many handheld devices, such as smart phones and tablet computers, contain computer technology that can interface directly with and support eyetracking and eyefollowing application software. Recording and analysis of the user's eye and hand activity, for example, may be performed within the handheld device itself. Additionally, the eyetracking image processing software and/or the eyefollower control software (that controls an eyefollower's gimbal and lens motors) can be executed on the handheld device processor, eliminating the need for duplicating that processing capability in the eyetracker instrument itself.

In various embodiments it may also be advantageous to utilize a camera or cameras already built into the handheld device to support the eyetracking and face detection functions of the eyetracker. In some eyefollower configurations, for example, a face detection function, operating with a relatively wide field of view, is used to detect the location of the face and/or eyes within a larger volume of free head space, and this detected face-location information is used to direct the eyetracking camera(s), which may have a significantly smaller field of view, to point at and focus on the user's eyes, thus allowing the eyetracking camera(s) to commence their eyetracking functions. The eyetracker's use of the handheld device's existing camera(s) can eliminate the need for including face-detection camera(s) in the eyetracker/eyefollower equipment itself.

In various embodiments, information about eyetracking and hand-operations may be transmitted wirelessly between the handheld device and remote data collection and analysis terminals.

Detachable Cameras

With many handheld devices, it may be desirable to use the device either with or without an eyetracking camera, or with or without an operating-scene/hand monitoring camera. For these cases, it is desirable to construct the cameras and their mounts such that they can be easily detached from the handheld device, i.e. easily removed from and reattached to the handheld device. The attachment mechanisms must, of course, accommodate both a) electronic connections to support information communication between the device and the camera or cameras the and b) mechanical connections to physically support the camera or cameras with respect to the handheld device.

Eyetrackers with Asymmetric Apertures

Some advanced eyetracking cameras employ asymmetric apertures that enable eye image processing algorithms to precisely measure the range of the user's eye(s) from the eyetracking camera (U.S. Ser. No. 14/634,410, Improved Asymmetric Aperture for Eyetracking). In various embodiments of eyetrackers mounted on handheld devices, the eyetracking camera may contain an asymmetric aperture.

Eyefollowers on Handheld Devices

Though present day eyefollowers with motorized camera-pointing gimbals and motorized lenses are practically too large to be attached to handheld devices today, the use of micro-electro-mechanical systems (MEMS) in Eyefollowers may make such implementations far more feasible in the future. In various embodiments of this invention, eyetrackers with eyefollower capabilities, including a motorized camera-pointing gimbal and/or a motorized camera lens, may be attached to the handheld device booms, allowing the eyetracking camera to follow the user's eye(s) as the relative position of the user's head moves with respect to the handheld device.

Closing Comments

Embodiments of systems and methods for implementing eyetracker mounts for use with handheld devices are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device for performing eyetracking on a handheld device, comprising:
   an eyetracking camera; and
   an eyetracking camera boom mount that physically and electrically connects a handheld device and the eyetracking camera,
   wherein the eyetracking camera boom mount includes an extension boom that positions the eyetracking camera behind hands of a user, providing the eyetracking camera with a view of eyes of the user that is unobstructed by the hand(s) of the user, wherein the extension boom provides a position and an orientation of the eyetracking camera with respect to the handheld device and its display, wherein the eyetracking camera uses the position and the orientation to determine a gazepoint of an eye of the user on the handheld device and its display.

2. The device of claim 1, wherein the extension boom is attached to the bottom of the handheld device.

3. The device of claim 1, wherein the extension boom is flexible.

4. The device of claim 3, wherein the flexible extension boom is instrumented with sensors to measure at least one of a position and an orientation of the eyetracking camera with respect to at least one of the handheld device and its display.

5. The device of claim 1, wherein the eyetracking camera and the eyetracking camera boom mount are detachable from the handheld device.

6. The device of claim 1, wherein the eyetracking camera contains an asymmetric aperture.

7. The device of claim 1, wherein the eyetracking camera is attached to the eyetracking camera boom mount through at least one of a motorized camera-pointing gimbal and a motorized camera lens, allowing the eyetracking camera to follow the eyes of the user as the relative position of a head of the user moves with respect to the handheld device.

8. A device for monitoring a person's hand operations on a handheld device, comprising:
   an operating-scene camera; and
   an operating-scene camera boom mount that physically and electrically connects a handheld device and the operating-scene camera,
   wherein the operating-scene camera boom mount includes an extension boom that positions the operating-scene camera behind hands of a user and provides the operating-scene camera with a view of the handheld device and the hand(s) of the user as the user operates the handheld device, wherein the extension boom provides a position and an orientation of the operating-scene camera with respect to the handheld device and its display, wherein the operating-scene camera uses the position and the orientation to determine hand activity of the user with respect to the handheld device and its display.

9. The device of claim 8 wherein the operating-scene camera's boom mount is attached to the bottom of handheld device.

10. The device of claim 8 wherein the operating-scene camera's boom mount is flexible.

11. The device of claim 8 wherein the operating-scene camera is detachable from the handheld device.

12. The device of claim 8 wherein the operating-scene camera is connected to the operating-scene camera mount through a motorized camera pointing gimbal that allows the operating-scene camera to follow a movement of the hands of the user.

* * * * *